United States Patent
Kim et al.

(10) Patent No.: US 10,034,261 B2
(45) Date of Patent: Jul. 24, 2018

(54) METHOD AND APPARATUS FOR PROVIDING SERVICE IN WIRELESS NETWORK

(71) Applicant: Samsung Electronics Co., Ltd., Suwon-si, Gyeonggi-do (KR)

(72) Inventors: Hyun-Jung Kim, Suwon-si (KR); Kiseok Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/206,732

(22) Filed: Jul. 11, 2016

(65) Prior Publication Data

US 2017/0181115 A1 Jun. 22, 2017

(30) Foreign Application Priority Data

Dec. 22, 2015 (KR) ........................ 10-2015-0184133

(51) Int. Cl.
*H04W 24/00* (2009.01)
*H04W 60/04* (2009.01)
*H04W 4/02* (2018.01)
*H04W 8/00* (2009.01)
*H04W 4/80* (2018.01)

(52) U.S. Cl.
CPC .......... *H04W 60/04* (2013.01); *H04W 4/023* (2013.01); *H04W 4/80* (2018.02); *H04W 8/005* (2013.01)

(58) Field of Classification Search
CPC ..... H04W 60/04; H04W 4/008; H04W 4/023; H04W 8/005
See application file for complete search history.

(56) References Cited

U.S. PATENT DOCUMENTS

| 8,260,320 B2 | 9/2012 | Herz |
| 8,965,407 B2 | 2/2015 | Dave et al. |
| 2015/0005011 A1 | 1/2015 | Nehrenz et al. |

(Continued)

FOREIGN PATENT DOCUMENTS

| KR | 100793348 B1 | 1/2008 |
| KR | 20120031787 A | 4/2012 |
| KR | 20150068857 A | 6/2015 |

OTHER PUBLICATIONS

Getting Started with iBeacon, Version 1.0, Jun. 2, 2014.

*Primary Examiner* — William Nealon
(74) *Attorney, Agent, or Firm* — Jefferson IP Law, LLP

(57) ABSTRACT

A technique for sensor network, Machine to Machine (M2M), Machine Type Communication (MTC), Internet of Things (IoT) is provided. The present disclosure can be applied to intelligent services (smart homes, smart buildings, smart cities, smart cars or connected cars, health care, digital education, retail, security and safety service) based on the technique. A method for operating a user equipment (UE) is provided. The method includes receiving a first signal comprising a first category identification (ID) and a first unique ID from a first beacon device, determining a distance from the first beacon device based on the first signal, if the distance is below a threshold, registering the first category ID, and if a second signal comprising the registered first category ID from a second beacon device, displaying information corresponding to a second unique ID of the second signal.

20 Claims, 15 Drawing Sheets

(56) References Cited

U.S. PATENT DOCUMENTS

| | | | |
|---|---|---|---|
| 2015/0095129 A1* | 4/2015 | Daigle | G06Q 30/0231 |
| | | | 705/14.27 |
| 2015/0140982 A1* | 5/2015 | Postrel | H04W 4/008 |
| | | | 455/418 |
| 2016/0094940 A1* | 3/2016 | Vigier | H04W 4/02 |
| | | | 455/456.3 |
| 2016/0125467 A1* | 5/2016 | Scott | H04W 4/043 |
| | | | 705/14.58 |

* cited by examiner

NEAR OR FAR DISTANCE        IMMEDIATE DISTANCE or

NEAR OR FAR DISTANCE        IMMEDIATE DISTANCE

METHOD AND APPARATUS FOR PROVIDING SERVICE IN WIRELESS NETWORK

CROSS-REFERENCE TO RELATED APPLICATION(S)

This application claims the benefit under 35 U.S.C. § 119(a) of a Korean patent application filed on Dec. 22, 2015 in the Korean Intellectual Property Office and assigned Serial number 10-2015-0184133, the entire disclosure of which is hereby incorporated by reference.

TECHNICAL FIELD

The present disclosure relates to a method and an apparatus for providing a service in a wireless network.

BACKGROUND

The Internet is evolving from a human-centered network for people's information creation and consumption to an Internet of things (IoT) enabling distributed components such as objects to exchange and process information. An Internet of everything (IoE) combining big data processing with the IoT through a connection to a cloud server is emerging. To implement the IoT, technological components such as sensing, wired/wireless communication and network infrastructure, service interface, and security are required. Recently, sensor network, machine to machine (M2M), and machine type communication (MTC) for connection between the objects are under development.

An IoT environment can provide an intelligent internet technology service for adding value to people's lives by collecting and analyzing data generated in the connected objects. The IoT is applicable to smart homes, smart buildings, smart cities, smart cars or connected cars, smart grids, health care, smart appliances, and advanced medical services by converging with existing Information technology (IT) and various industries.

As an alternative to near field communication (NFC) which is a close-range wireless communication, a Bluetooth low energy (BLE) beacon using BLE is suggested. The BLE beacon is being commercialized in various fields such as position information, marketing, purchase, and automatic check-in.

An effective communication range of the NFC is limited to about 4~20 cm, whereas an effective communication range of the BLE beacon is expanding to about 5 cm~50 m. The NFC installs a separate chip in every mobile communication terminal, whereas the BLE beacon allows the close-range wireless communication using a beacon merely using a BLE recognition function. Naturally, the BLE beacon is more economic than the NFC and provides the wireless communication service even in a wide space.

The BLE beacon features low power consumption so as to provide the wireless communication service lasting over one year by merely using one coin-sized battery. Further, Bluetooth of previous versions has been limited to roughly seven slave devices, whereas BLE 4.0 of a recent version can synchronize with an unlimited number of slave devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for providing a service in a wireless network.

Another aspect of the present disclosure is to provide a method and an apparatus for selectively displaying information corresponding to beacon signals received in a user equipment (UE).

Another aspect of the present disclosure is to provide a method and an apparatus for determining a user's intention by measuring a distance between a beacon device and a UE according to a received beacon signal strength in the UE.

Another aspect of the present disclosure is to provide a method and an apparatus for displaying information corresponding to a user's intention in a UE.

In accordance with an aspect of the present disclosure, a method for operating a UE is provided. The method includes receiving a first signal including a first category identification (ID) and a first unique ID from a first beacon device, determining a distance from the first beacon device based on the first signal, if the distance is below a threshold, registering the first category ID, and if a second signal comprising the registered first category ID is received from a second beacon device, displaying information corresponding to a second unique ID of the second signal.

In accordance with another aspect of the present disclosure, a UE is provided. The UE includes a communication unit for receiving a first signal comprising a first category ID and a first unique ID from a first beacon device, a control unit configured to determine a distance from the first beacon device based on the first signal and, when the distance is below a threshold, register the first category ID, and a display unit configured to display, when receiving a second signal comprising the registered first category ID from a second beacon device, information corresponding to a second unique ID of the second signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure provide a technique for selectively receiving information corresponding to a beacon signal in a wireless network environment.

Hereinafter, terms indicating objects (e.g., a server, a user equipment (UE), a department store or shopping mall), terms indicating signals (e.g., packets, messages) transmitted/received between the objects, and information indicating states (e.g., user state information, product state information) are mentioned by way of example. The present disclosure is not limited those terms and can adopt other equivalent terms.

Figure 1:
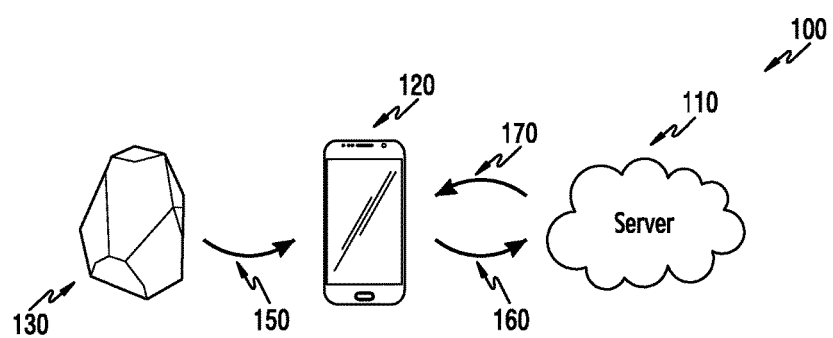
FIG. 1 depicts a wireless network environment according to an embodiment of the present disclosure.

FIG. 1 depicts a wireless network environment according to an embodiment of the present disclosure.

Referring to FIG. 1, the network environment 100 includes a server 110, a UE 120, and a beacon device 130.

The server 110 can reside in or outside the network environment 100. For example, the server 110 may include a server in a store or a cloud server outside a store. The server 110 can store various data. For example, the server 110 can store product or service information of stores of a department store or shopping mall.

The UE 120 can include various devices communicating with the server 110 and the beacon device 130. For example, the UE 120 can include a mobile phone, a smart phone, a personal digital assistant (PDA), a portable multimedia player (PMP), a digital camera, a music player, a portable game console, a navigation system, a laptop computer, a wearable device, and so on.

The beacon device 130 indicates a device for sending a radio signal to the UE 120. The radio signal can indicate a Bluetooth low energy (BLE) beacon signal. To ease the understanding, the radio signal is referred to as the beacon signal. The beacon device 130 can send a beacon signal 150 to the UE 120 using various communication schemes. For example, the beacon device 130 can send the beacon signal 150 using wireless fidelity (WiFi) direct, infrared ray (IR), and Bluetooth. The beacon device 130 can broadcast fixed information of a packet to the UE 120. The fixed information can include various information. For example, the beacon signal 150 can include an identifier (ID) of the beacon device 130. Also, the beacon signal 150 can include brief product information. For example, the beacon signal 150 can include product identification information. The beacon device 130 can periodically send the beacon signal 150 to the UE 120. For example, a signal transmission cycle from the beacon device 130 to UEs can range, but not limited to, from 200 ms to 300 ms. The beacon device 130 can send the signal at intervals predefined by a user or on a different transmission cycle according to a purpose. The UE 120 periodically receives the signals from the beacon device 130 within an effective distance of the beacon device 130. That is, the UE 120 can receive the signal from the beacon device 130 in coverage of the beacon device 130.

Pairing may be unnecessary for the UE 120 to receive the beacon signal from the beacon device 130. The pairing is a process for registering a counterpart for the wireless communication connection such as Bluetooth. For example, when the UE 120 requires separate pairing in order to receive the beacon signal from the beacon device 130, the UE 120 needs to register a unique identifier for identifying the beacon device 130 in the UE 120 and can receive only a beacon signal corresponding to the registered identifier from the beacon device 130. However, since the separate pairing is unnecessary in receiving the beacon signal from the beacon device 130, the UE 120 can receive the beacon signal from the arbitrary beacon device 130.

The beacon device 130 can send the beacon signal 150 to the UE 120 with a certain signal strength. That is, the UE 120 in an effective range of the beacon signal 150 from the beacon device 130 can receive the beacon signal 150. For example, the effective range of the beacon signal 150 can be 50 m. In this case, the UE 120 can receive the beacon signal 150 within 50 m from the beacon device 130.

The UE 120 can send a message 160 to the server 110. The UE 120 can send the message 160 to the server 110 in various manners. The message 160 can contain various information. For example, the message 160 can include a message of the UE 120 requesting information corresponding to the beacon signal 150 received from the beacon device 130. For example, the message 160 can include product list information stored in the UE 120. The product list can be stored according to various embodiments. For example, the user can record his/her desired product for purchase, in the product list of the UE 120. For example, the product list can be generated according to other purchaser's recommendation. For example, the product list can list products recommended by a product seller. The message 160 can include an ID of the UE 120.

The server 110 can send a message 170 to the UE 120. The message 170 can contain various information. For example, the message 170 can include detailed product information. The detailed product information can include detailed information about a product to be purchased by the user. For example, the detailed product information can include various product features such as a category, a price, a color, and a manufacturer of the product. The detailed product information can be generated by the server 110 in various types. For example, the product information can combine one or more of uniform resource locator (URL), text, image, and video.

As such, the beacon signal is the technique for delivering the fixed information to the UE with low power. For the features of the beacon signal, a packet structure of the beacon signal is now described.

Figure 2:
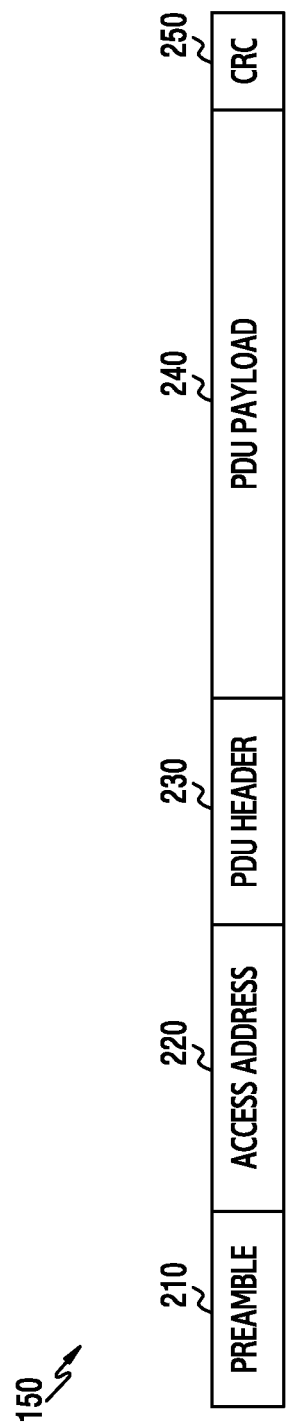
FIG. 2 depicts a packet structure of a beacon signal according to an embodiment of the present disclosure.

FIG. 2 depicts a packet structure of a beacon signal according to an embodiment of the present disclosure. The packet structure of the beacon signal can correspond to the beacon signal 150 of FIG. 1.

Referring to FIG. 2, the beacon signal 150 includes a preamble 210, an access address 220, a protocol data unit (PDU) header 230, a PDU payload 240, and a cyclic redundancy check (CRC) 250. While the components are depicted in FIG. 2 only to ease the understanding, they can change in some cases. For example, a size of the PDU payload 240 can increase or decrease according to the power consumption and the fixed information size of the beacon device 130, and the CRC 250 can be omitted.

The preamble 210 is used to stably send and receive the beacon signal 150. For example, using the preamble 210, the UE 120 can synchronize a frequency, estimate symbol timing, and perform automatic gain control of the beacon signal 150 received from the beacon device 130. The access address 220 is a field for identifying the beacon signal on a physical layer channel. For example, using the access address 220, the UE 120 can determine whether the current beacon signal is received on an advertising channel or on a data physical channel. The advertising channel is a channel between two or more devices by advertising a packet on the channel. The data physical channel is a channel for communicating two or more devices that are connected. The PDU header 230 can include information of logical transport and logical link identifiers. For example, the PDU header 230 can include information (e.g., a length of the PDU payload 240) of the PDU payload 240. The PDU payload 240 can include information of a logical link control and adaptation protocol (L2CAP) signal, L2CAP frames, or user data. For example, the PDU payload 240 can include information for distinguishing the product ID or the beacon device 130 from other beacon devices. The CRC 250 can include data transport error detection information.

Figure 3:
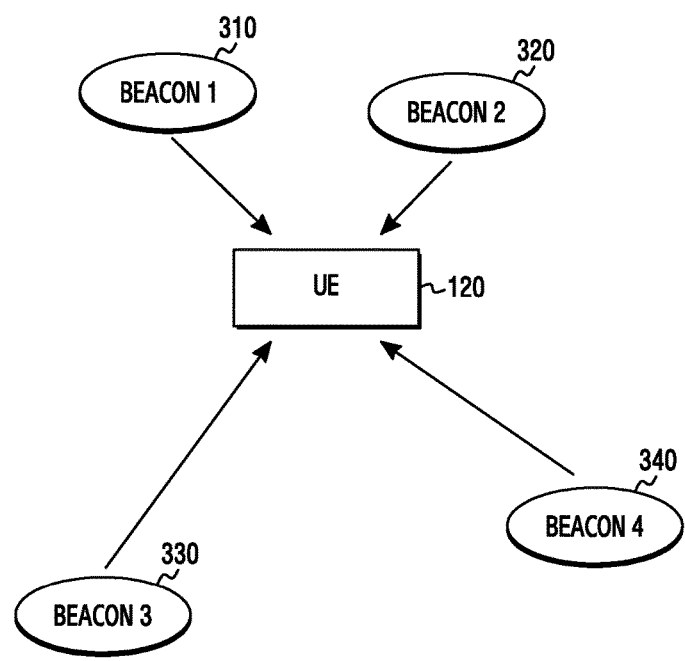
FIG. 3 depicts signal reception of a user equipment (UE) from a plurality of beacon devices according to an embodiment of the present disclosure.

FIG. 3 depicts signal reception of a UE from a plurality of beacon devices according to an embodiment of the present disclosure.

Referring to FIG. 3, four beacon devices 310 through 340, i.e., beacon 1 310, beacon 2 320, beacon 3 330, and beacon 4 340, send a beacon signal to a UE 120. In FIG. 3, the number of the beacon devices sending the beacon signal to the UE can be greater or smaller than four. The beacon devices can reside in, for example, stores geographically separated. The signals sent from the beacon devices can include, for example, information of products in the stores. In FIG. 3, the UE is assumed to be within a distance for receiving all of the signals from the beacon devices. That is, the UE is assumed to be in an effective communication distance of about 5 cm~50 m from the beacon devices. In the effective communication distance, the beacon devices send a beacon signal at different distances from the UE. In so doing, the beacon signal can include a category ID and a unique ID. For example, a first beacon signal of the beacon signals might include a category ID indicating a product category 'shoes' and a unique ID indicating more detailed information of the shoes product, for example, a specific shoe store. A second beacon signal might include a category ID indicating a product category 'apparel' and a unique ID indicating more detailed information of the apparel product, for example, a specific apparel store. Herein, the category ID can be referred to as an upper ID and a primary ID, and the unique ID can be referred to as a lower ID and a secondary ID.

The UE receives all of the signals from the beacon devices within the communication distance. That is, when a Bluetooth function of the UE is activated, the UE needs no separate pairing in order to receive the signal from the beacon device. Hence, regardless of whether the unique ID indicating the beacon device is registered in the UE, the UE can receive all of the signals from the beacon devices within its effective communication distance. The received signals may contain a user's desired information or the user's unwanted information. When the UE displays all the information of the received signals on its display, the user's unwanted information can be displayed on the display. Thus, the UE is required to selectively display the information contained in the signals received from the beacon devices on its display.

Figure 4:
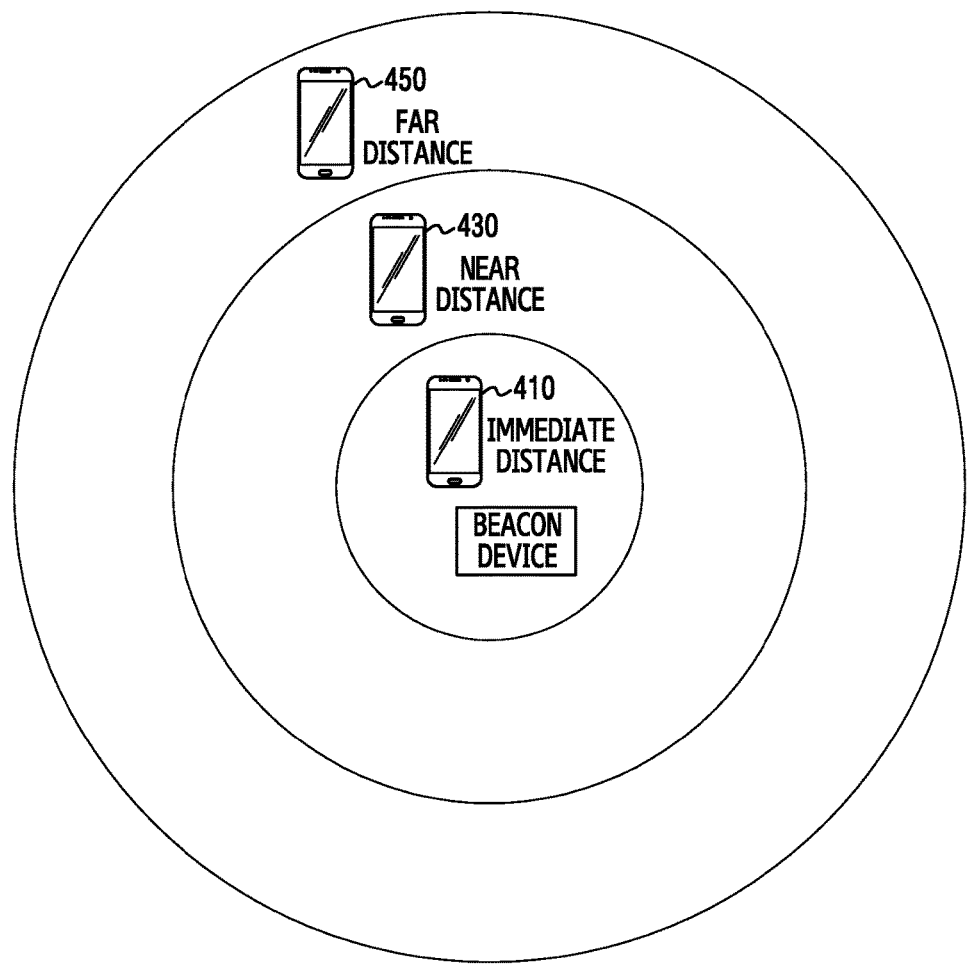
FIG. 4 depicts distance ranges between a UE and a beacon device divided according to a received signal strength of the UE from the beacon device according to an embodiment of the present disclosure.

FIG. 4 depicts distance ranges between a UE and a beacon device divided according to a received signal strength of the UE from the beacon device according to an embodiment of the present disclosure.

Referring to FIG. 4, the beacon device sends a beacon signal to the UE. In so doing, a beacon received signal strength, that is, a received signal strength indication (RSSI) of the UE can differ according to a distance between the UE and the beacon device. When the UE is close to the beacon device, the RSSI of the beacon signal received at the UE can be relatively great. When the UE is distant from the beacon device, the RSSI of the beacon signal received at the UE can be relatively small. Accordingly, the UE can determine the relative distance between the UE and the beacon device based on the RSSI of the beacon signal received from the beacon device. For example, when the RSSI of the beacon signal received from the beacon device exceeds a first threshold, the UE can recognize that the UE is within an immediate distance 410 from the beacon device. When the RSSI of the beacon signal received from the beacon device is below the first threshold and exceeds a second threshold, the UE can recognize that the UE is within a near distance 430 from the beacon device. When the RSSI of the beacon signal received from the beacon device is below the second threshold, the UE can recognize that the UE is a far distance 450 from the beacon device.

The threshold indicates a variable of, for example, a particular state or a sudden change when the RSSI of the beacon signal received from the beacon device reaches a particular value. The thresholds can be defined in the UE in various manners. For example, the thresholds can be defined by reflecting user's preference. For example, when the user of the UE shops at a department store or shopping mall where multiple beacon devices are placed, the thresholds can be defined based on the user's movements. In other words, the UE can estimate the user's favorite products from information contained in signals received from the beacon devices along the user's movements in the department store or shopping mall during a certain time, and define or change an adequate threshold for displaying information corresponding to the favorite products.

While the distance between the beacon device and the UE is divided into three ranges of an immediate distance 410, a near distance 430, and a far distance 450 in FIG. 4, the distance between the beacon device and the UE can be divided into fewer ranges or more ranges. For example, when the number of thresholds for dividing the ranges differs depending on a purpose, the distance between the beacon device and the UE can be divided into a plurality of ranges according to the number of the thresholds.

While the ranges divided based on the RSSI of the beacon signal received from the beacon device are depicted as circular in FIG. 4, they can be divided in different shapes. That is, when a communication state between the UE and the beacon device changes or an obstacle is present between them according to a location of the UE, the RSSI of the beacon signal received at the same distance can differ. Hence, the distance recognized as the same distance based on the RSSI can differ from the physical distance, and the range can be divided by the threshold of the RSSI in various shapes.

The distance between the UE and the beacon device is measured according to the RSSI of the UE by way of example. The UE can measure the distance from the beacon device in various fashions.

Figure 5:
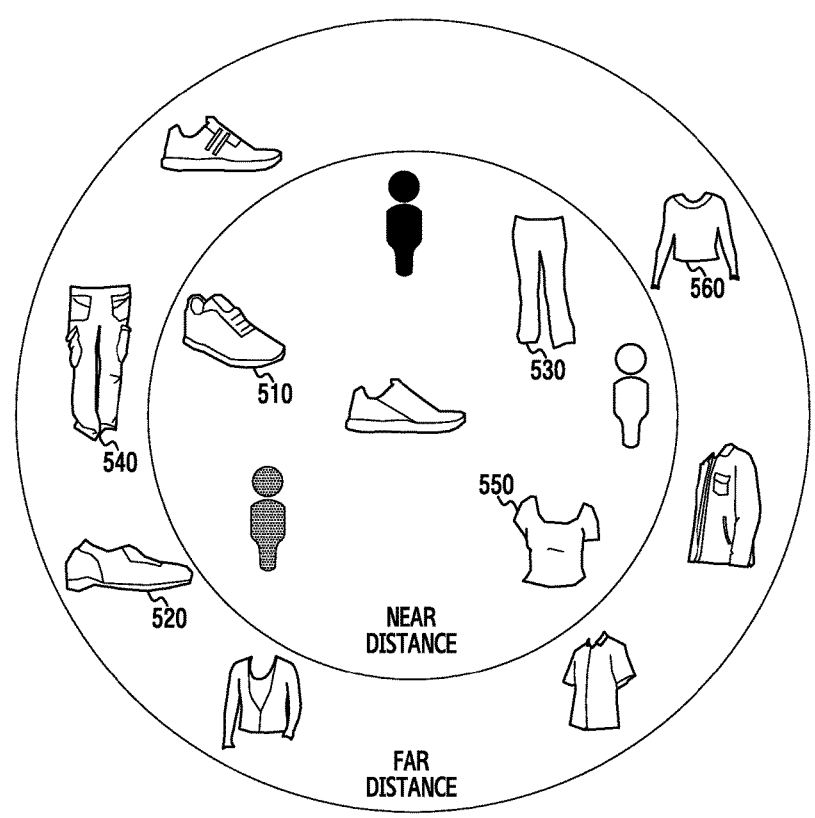
FIG. 5 depicts a user's favorite products and product distribution based on a distance according to an embodiment of the present disclosure.

FIG. 5 depicts a user's favorite products and product distribution based on a distance according to an embodiment of the present disclosure.

Referring to FIG. 5, it is assumed that the user shops in a department store or shopping mall including various stores. Beacon devices can be positioned in the various stores and can periodically send a beacon signal to the UE of the user doing the shopping. The beacon device is in the effective communication distance from the UE such that the UE can receive the beacon signal. Provided that the user is at the center of the circle of FIG. 5, beacon devices 510 through 560 indicate relative locations based on the user in the department store or shopping mall. Concentric circles in FIG. 5 indicate the same distance ranges from the user at the center of the circle. Based on the concentric circle, the distance between the user and an arbitrary beacon device can be divided into a near range and a far range. The near range and the far range can be determined based on, for example, the RSSI of the signal received at the UE from the beacon device. Images corresponding to the beacon devices indicate a product type in the store of the beacon device. For example, a shoe image corresponding to the beacon device 510 indicates the beacon device 510 in a shoe store, and a trouser image corresponding to the beacon device 530 indicates the beacon device 530 in a clothing store. The beacon signal from the beacon device can include store information of the beacon device. That is, the beacon signal from the beacon device can include the category ID and the unique ID.

The category ID can indicate a product or service type of the store of the beacon device which sends the beacon signal including the category ID. For example, the category ID can indicate which one of food, clothing, home appliances, tools, sporting goods, and cosmetics are in the store of the beacon device. For example, the category ID can specify the product type on sale in the store of the beacon device. For example, when the store of the beacon device sells clothing, the category ID can indicate which one of outdoor outer, long underwear, suit, underwear, and sportswear is in the store of the beacon device. Hence, the beacon signals from the beacon devices in the stores classified to the same product type include the same category ID. A range of the product type indicated by the category ID can vary. That is, when the category ID indicates the product type corresponding to the food, the clothing, the home appliance, the tools, the sporting goods, and the cosmetics, beacon signals from the beacon devices of the same product type, for example, of the formal dress shop and the sportswear shop the clothing can include the same category ID. For example, when the category ID indicates the product type corresponding to the outdoor outer, the long underwear, the suit, the underwear, and the sportswear, beacon signals from the beacon devices in the formal dress shop and the sportswear shop belonging to the same product type, for example, the clothing can include different category IDs. The product range indicated by the category ID is not limited to those examples. For example, the category ID can indicate products of high possibility that the user of the UE recognizes them as the same product type. When the shoes and clothing are separated in the product type and indicated by different category IDs, the category ID of the beacon signal from the beacon device 510 is different from the category ID of the beacon signal from the beacon device 530.

The unique ID indicates unique store information of the beacon device sending the beacon signal including the unique ID. That is, the unique ID can uniquely distinguish the shops in the department store or shopping mall. For example, even when different shops in the department store or shopping mall sell products of the same type, the unique IDs of the beacon signals from the beacon devices in different shops can have different values. The unique ID can specify the product type indicated by the category ID. For example, when the category ID of the beacon signal indicates the product type 'clothing', the unique ID of the beacon signal can indicate a particular brand shop (e.g., Hazzys™, Renoma™, ZIOZIA™, LUOMO™, POLO™, Bean Pole™) selling 'clothing' in the department store or shopping mall. For example, when the category ID of the beacon signal indicates the product type 'shoes', the unique ID of the beacon signal can indicate a particular brand shop (e.g., NIKE™, ADIDAS™, FILA™, Reebok™, Converse™) selling 'shoes in the department store or shopping mall. When two or more shops of the same brand sell the same products in the department store or shopping mall, beacon signals from the beacon devices in the two or more shops include the same category ID but different unique IDs. For example, when there are two NIKE™ shops in the department store or shopping mall, beacon signals from the beacon devices in the two shops include the same category ID but different unique IDs. Based on the unique ID, the UE can obtain product information of a particular shop corresponding to the unique ID, to be explained in FIG. 8.

The category ID and the unique ID each can include a bit string. The bit string of the category ID and the bit string of the unique ID can occupy a specific position in the beacon signal packet. That is, the positions of the bit string of the category ID and the bit string of the unique ID can be pre-arranged on the beacon signal packet. Hence, when receiving the beacon signal from the beacon device, the UE can obtain the category ID and the unique ID by extracting bits from the pre-arranged positions in the beacon signal packet.

In FIG. 5, the shoe image at the center of the circles signifies that the user is interested in the shoes during the shopping. Naturally, the user wants to obtain information in the beacon signals from the beacon devices 510 and 520 of the shoe stores. Also, the user does not want to obtain information in the beacon signals from the beacon devices 530, 540, 550, and 560 of the clothing shops. However, since the UE does not require the separate pairing with the beacon device in order to receive the beacon signal, the UE receives the beacon signals from all of the beacon devices 510 through 560 of FIG. 5. In this regard, the UE needs to selectively display user's desired information from the signals received from the beacon devices on its display.

Information corresponding to the signals received from the beacon devices can be selectively displayed on the display of the UE based on, for example, the distance between the user and the UE. That is, the UE can display only the information corresponding to the signals received from the beacon devices in the near range on its display in FIG. 5. In this case, the UE displays the user's unwanted information corresponding to the signals from the beacon devices 530 and 550. Also, the UE does not display user's desired information corresponding to the signal from the beacon device 520 in the far range.

Thus, regardless of the relative distance between the user or the UE and the beacon devices, the UE determines the user's favorite product type and selectively displays desired product information based on the received beacon signal.

Figure 6A:
FIGS. 6A to 6C depict a UE for recognizing a user's favorite product information based on a received signal strength according to various embodiments of the present disclosure.
Figure 6A:
Figure 6A:
Figure 6A:
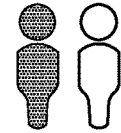
Figure 6A:
Figure 6A:
Figure 6B:
Figure 6B:
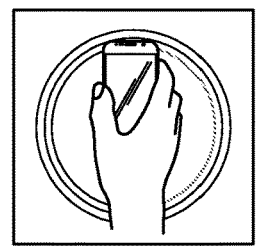
Figure 6C:
Figure 6C:
Figure 6C:
Figure 6C:
Figure 6C:
Figure 6C:
Figure 6C:

FIGS. 6A to 6C depict a UE selectively displaying a user's favorite product information on its display according to various embodiments of the present disclosure.

Referring to FIG. 6A, when the user's favorite product is shoes, the UE receives a beacon signal from a beacon device according to a distance between the beacon device of the shoe store and the UE. The UE and the beacon device can be in a far range, a near range, or an immediate range. Since the UE does not require the separate pairing with the beacon device in order to receive the beacon signal from the beacon device, the UE receives beacon signals from all of beacon devices 612, 614, 616, and 618 in an effective communication range regardless of whether the far distance, the near distance, or the immediate distance between the UE and the beacon device.

Referring to FIG. 6B, the UE determines the user's favorite product. For example, when a distance between a particular beacon device and the UE falls within a threshold, the UE can determine that the user prefers products in a store of the particular beacon device. That is, it is assumed that, when the user prefers a particular product, the user approaches the store of the product. The threshold can include, for example, the immediate distance. Herein, the immediate distance can indicate a close distance enough for a radius based on the location of the UE to cover a particular beacon device alone. For example, when the user shops in the department store or shopping mall, the immediate distance can indicate a normal distance between the beacon device of the particular store and the user so as to determine the user entering the particular store prefers a particular type of the product in that store.

To determine the immediate distance between the UE and the beacon device, the UE can use, for example, signal strength information received from the beacon device. That is, the UE can determine whether the distance between the UE and the beacon device is the immediate distance based on the RSSI of the beacon signal received from the beacon device. When the RSSI of the beacon signal received from the beacon device exceeds a threshold corresponding to the immediate distance, the UE can determine the immediate distance from the beacon device. Herein, the threshold corresponding to the immediate distance can be great enough to reflect the close distance between the UE and the beacon device.

To determine the user's favorite product type, the UE can use NFC. The NFC, which is a kind of radio frequency identification (RFID), indicates communication between devices in a close range using a noncontact close-range wireless communication module (hereafter, referred to as an NFC module) using a frequency band of 13.56 MHz. The UE can receive or send data from or to a device by tagging to the device including the NFC module. The tagging indicates that the UE is placed at a close distance, for example, in an NFC communication range 4~20 cm to allow the communication between the UE and the NFC module. Hereafter, tagging the UE to the NFC indicates that the UE is placed near the device including the NFC module. For example, when the UE is tagged to an NFC of the beacon device in the shoe store, the UE can determine that the user's favorite product is shoes. For example, when the UE is tagged to an NFC attached to the shoes, the UE can determine that the user's favorite product is shoes.

Upon determining the user's favorite product type, the UE registers the category ID of the beacon signal received from the beacon device. The UE can identify the category ID by extracting bits at the pre-arranged position in the beacon signal packet received from the beacon device, and register the category ID. Registering the category ID in the UE indicates storing the bit string corresponding to the category ID in a storage unit of the UE. For example, when the category ID indicating the product type 'shoes' is '011' and the UE is placed in a threshold distance from the beacon device of the shoe store or tagged to the NFC of the shoes, the UE can receive the beacon signal from the beacon device, extract the bit string '011' at the pre-arranged position of the category ID on the beacon signal packet, and register as the category ID of the favorite product.

The method of the UE for determining the user's favorite product type is not limited those examples. For example, when the user inputs his/her shopping list to the UE before the shopping, the UE can determine the favorite product type based on shopping list information. When the user inputs the shopping list in advance, the UE can identify the category ID corresponding to the product type input in the shopping list and register the identified category ID.

A plurality of category IDs can be registered in the UE. For example, when multiple products are determined as the user's favorite products, the UE can identify and register the category IDs indicating the respective products. The UE can identify the category IDs indicating the respective favorite products when the UE is very close to the beacon device, when the UE is tagged to the NFC device in the store of the favorite product, when the UE is tagged to the NFC attached to the favorite product, or when the UE determines favorite products based on the pre-input shopping list.

Referring to FIG. 6C, the UE registers the category ID indicating the user's favorite product type and then displays product information corresponding to the beacon signal including the same category ID as the registered category ID. The UE can determine the user's favorite product by determining whether the distance between the beacon device in the store of the user's favorite product and the UE falls within the threshold, and display information corresponding to the beacon signal received from the beacon device of the favorite product store out of the threshold distance from the UE. After registering the category ID, the UE receives the beacon signals from all of beacon devices 612 through 618 in the beacon signal reception range; that is, at the immediate distance, the near distance, the far distance, and determines whether the category ID in each beacon signal is the same as the category ID registered in the UE. For doing so, the UE determines whether the bit string corresponding to the category ID registered in the UE is identical to the bit string at the pre-arranged position of the category ID on the beacon signal packet received at the UE. For example, when the UE registers a bit string '011' corresponding to the category ID indicating the product type 'shoes', the UE can determine whether the bit string at the pre-arranged position of the category ID in the received beacon signal is '011'. The UE can selectively display only information corresponding to the beacon signal including the same category ID as the registered category ID. For example, when the product type indicated by the registered category ID is the shoes, the user can selectively acquire shoes information of the user's favorite product.

Figure 7:
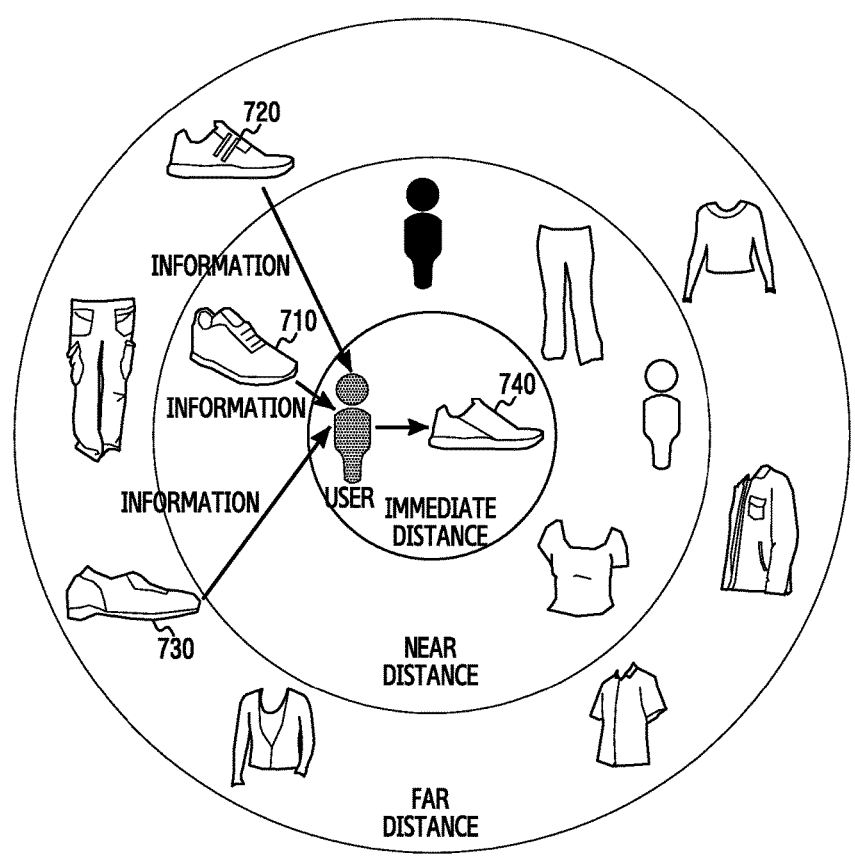
FIG. 7 depicts a user's favorite product information selectively displayed on a display of a UE in distance-based product distribution according to an embodiment of the present disclosure.

FIG. 7 depicts user's favorite product information selectively displayed on a display of a UE in distance-based product distribution according to an embodiment of the present disclosure.

Referring to FIG. 7, products such as shoes and clothes indicate relative locations of beacon devices in respective product stores. A user at the center of circles indicates a location of a UE carried by the user. Arrows show that only the beacon devices 710, 720, and 730 send information to the UE. However, the arrows signify that the UE selectively displays only information corresponding to beacon signals received from the beacon devices 710, 720, and 730 on its display. Namely, the UE receives the beacon signals from all the beacon devices in FIG. 7 but selectively displays on its display only the information corresponding to the beacon signals including a category ID corresponding to a user's favorite product, for example, shoes.

In FIG. 7, the UE is in the immediate distance from a beacon device 740. That is, when the user is in a threshold distance from the beacon device 740, the UE can determine that the user's favorite product is the shoes. The threshold is used as a reference for determining whether the distance between the UE and the beacon device is the immediate distance. When the distance between the UE and the beacon device is in the threshold range, the UE extracts and registers the category ID indicating the shoes from the signal received from the beacon device 740. Next, when a beacon device outside the threshold range also sends a beacon signal including the category ID indicating the shoes, the UE displays information corresponding to the beacon signal on the display. For example, a beacon device 710 is at the near distance, and a beacon device 720 and a beacon device 730 are at the far distance. While all of the beacon device 710, the beacon device 720, and the beacon device 730 are out of the threshold distance from the UE, they are placed in the shoe store and their beacon signal includes the category ID indicating the shoes. Hence, the UE can receive the beacon signals from the beacon devices 710, 720, and 730, and display information corresponding to the beacon signals on the display. That is, regardless of the distance from the beacon device, the UE can display on its display the information corresponding to the beacon signal including the category ID registered in the UE among all of the beacon devices in the beacon signal reception range.

Figure 8:
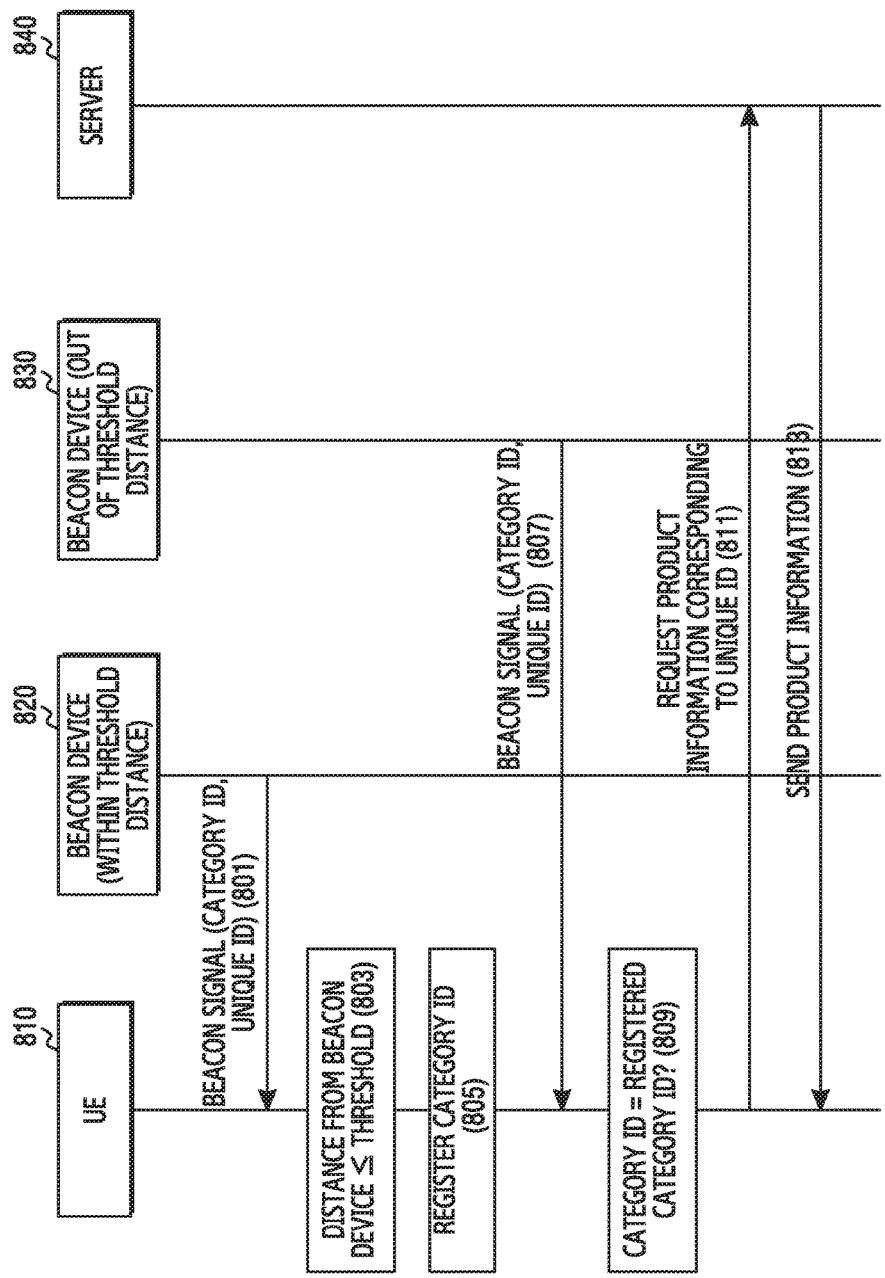
FIG. 8 depicts signal flow for selectively receiving a user's favorite product information in a UE according to an embodiment of the present disclosure.

FIG. 8 depicts signal flow for selectively displaying user's favorite product information in a UE according to an embodiment of the present disclosure.

Referring to FIG. 8, a UE 810 receives a beacon signal from a beacon device 820 in operation 801. The beacon device 820 indicates a beacon device within a threshold distance from the UE 810. The distance in the threshold can indicate a close distance enough to cover only one particular beacon device in the radius based on a location of the UE 820. For example, when the user shops in the department store or shopping mall and enters a particular store, the distance in the threshold can indicate a normal distance between a beacon device of the particular store and the user so as to determine that the user prefers a product in the particular store.

The signal from the beacon device 820 includes a category ID and a unique ID. The category ID can indicate the product type in the store of the beacon device 820, and the unique ID can indicate unique information of the store of the beacon device 820. The category ID and the unique ID can include bit strings at pre-arranged locations on the beacon signal packet.

In operation 803, the UE 810 determines whether a distance from the beacon device 820 falls within a threshold. The distance within the threshold can be determined based on, for example, RSSI of the beacon signal received at the UE 810 from the beacon device 820. That is, when the RSSI of the beacon signal received at the UE 810 from the beacon device 820 exceeds the threshold, the UE 810 can determine that the beacon device 820 and the UE 810 are within the threshold distance.

Upon determining the beacon device 820 and the UE 810 within the threshold distance, the UE extracts and registers the category ID of the beacon signal received from the beacon device 820 in operation 805. That is, since the beacon device 820 is in the threshold distance with the UE 810, the UE 810 determines that a store of the beacon device 820 sells a user's favorite product and extracts and registers the category ID from the signal received from the beacon device 820.

Registering the category ID in the UE 810 is not limited to extracting and registering the category ID from the signal received from the beacon device 820 within the threshold distance. For example, when the user inputs his/her favorite product list to the UE 810, the UE 810 can register category IDs corresponding to product types of the favorite product list. The user can input or select favorite products by executing an application provided from a store (e.g., a department store or shopping mall). Alternatively, the user, when knowing the category ID, can directly input the category ID corresponding to the favorite product.

A server which manages the application can pre-store category IDs corresponding to product types in the department store or shopping mall. When the user inputs or selects favorite products using the department store or shopping mall application, the UE 810 can receive from the server, category ID information corresponding to the product types input or selected by the user and register the category IDs. The server for managing the department store or shopping mall application can be a server 840.

For example, the UE 810 can register the category ID using NFC tagging. When the UE is tagged to an NFC attached to a particular product, the UE 810 can determine that the user prefers the particular product, receive category ID information from the NFC attached to the particular product, and register the category ID indicating the particular product type.

When registering the category ID, the UE 810 can ask the user about whether to register the category ID indicating a particular product. For example, when the UE 810 registers the category ID in the threshold distance with the beacon device 820 or when the UE 810 is tagged to the NFC attached to a particular product and registers the category ID, the UE 810 can display a pop-up window on a display of the UE before registering the category ID and ask the user about whether to register the corresponding category ID. The pop-up window can be presented in various types. For example, when the UE 810 determines that the user prefers shoes, the pop-up window can include a message 'Do you want to register shoes as your favorite product?'. When the user allows registering a particular product as his/her favorite product in the UE 810 through the pop-up window, the UE 810 registers the category ID indicating the particular product. By contrast, when the user declines to register a particular product as his/her favorite product in the UE 810 through the pop-up window, the UE 810 does not register the category ID indicating the particular product. That is, although the UE 810 is within the threshold distance from the beacon device 820 or although the UE 810 is tagged to the NFC attached to a particular product and determines the user's favorite product, once the user declines the favorite product registration through the pop-up window, the UE 810 may not register the category ID indicating the product determined as the favorite product.

The UE 810 displays the message in the pop-up window to ask the user about whether to register the corresponding category ID by way of example. The UE 810 can notify the user of the category ID registration in various manners. The UE 810 can notify the user that a particular product is determined as the favorite product by displaying the pop-up window and sounding a notification.

Although not depicted in FIG. 8, when the beacon device 820 is in the threshold distance with the UE 810, the UE 810 can display information corresponding to the beacon signal received from the beacon device 820 on its display. That is, when the beacon device 820 is within the threshold distance from the UE 810, this means that the user prefers a product in the store of the beacon device 820. Hence, the UE 810 can display information of the user's favorite product based on the signal received from the beacon device 820.

In operation 807, the UE 810 receives a beacon signal from a beacon device 830. The beacon device 830 indicates a beacon device outside the threshold distance from the UE 810. The beacon signal from the beacon device 830 also includes a category ID and a unique ID. Depending on the product type of the store of the beacon device 830, the category ID may be the same as or different from the category ID of the beacon signal of the beacon device 820. For example, when both of the stores of the beacon device 820 and the beacon device 830 sell shoes, the signals from the beacon device 820 and the beacon device 830 include the same category ID. By contrast, when the store of the beacon device 820 sells shoes and the store of the beacon device 830 sells clothes, the beacon signals from the beacon device 820 and the beacon device 830 can include different category IDs. Since the unique ID contains unique information of the store of the beacon device and identifies the store, the unique ID of the beacon signal from the beacon device 830 is different from the unique ID of the beacon signal from the beacon device 820.

In operation 809, the UE 810 determines whether the category ID of the signal from the beacon device 830 is the same as the registered category ID. That is, the UE 810 extracts bits at a pre-arranged location of the category ID on the beacon signal packet received from the beacon device 830, and determines whether the extracted bits are identical with the category ID bits registered therein. When the category ID of the beacon signal from the beacon device 830 is the same as the category ID registered in the UE 810, the UE 810 displays information corresponding to the beacon signal received from the beacon device 830. When the category ID of the beacon signal from the beacon device 830 is different from the category ID registered in the UE 810, the UE 810 does not display information corresponding to the beacon signal received from the beacon device 830.

In FIG. 8, when receiving the beacon signal including the same category ID as the category ID registered in the UE 810, the UE 810 displays the information corresponding to the beacon signal. When receiving the beacon signal including the same category ID as the category ID registered in the UE 810, the UE 810 extracts the unique ID from the beacon signal. Next, the UE 810 requests product information corresponding to the extracted unique ID from the server 840 in operation 811. The server 840 can pre-store information of the store indicated by the unique ID. For example, the server 840 can pre-store the information of the stores indicated by the unique IDs such as a product list, product prices, sales, a product guarantee or warranty period, and a specific location of the store indicated by the unique ID. When the UE 810 requests the product information corresponding to the extracted unique ID, the server 840 sends the product information of the store indicated by the corresponding unique ID to the UE 810 in operation 813. The UE 810 displays the product information received from the server 840 on its display.

The server 840 can pre-store URL information of the store indicated by the unique ID. The UE 810 can request the product information corresponding to the unique ID from the server 840, receive URL information of the store brand indicated by the unique ID from the server 840, and display a website corresponding to the URL on the display. For example, the user prefers shoes and registers a category ID indicating the shoes in the UE 810 and the UE 810 receives a beacon signal from the beacon device 830 in a Nike™ shoe store. In this case, the UE 810 can request product information corresponding to the unique ID of the beacon signal from the server 840, receive Nike™ URL information from the server 840, and display a Nike™ website on its display.

While the UE 810 receives the beacon signals from two beacon devices 820 and 830 in FIG. 8, the UE 810 can receive a beacon signal from any beacon device in its effective communication range. Also, while the beacon device 830 is out of the threshold distance from the UE 810, the beacon device 830 can be placed within the threshold distance from the UE 810. That is, upon receiving the beacon signal including the same category ID as the category ID registered in the UE 810, the UE 810 displays product information corresponding to the beacon signal on its display. In so doing, as far as the UE 810 receives the beacon signal including the same category ID as the category ID registered therein, the distance between the UE 810 and the beacon device sending the corresponding beacon signal does not matter.

While the UE 810 registers only the category ID of the beacon signal received from the beacon device 820, the UE 810 can register a plurality of category IDs. For example, when the UE 810 is within the threshold distance from the beacon device 830 and the category ID of the beacon signal received from the beacon device 820 is different from the registered category ID, the UE 810 can determine that the user also prefers products in the store of the beacon device 830 and register the category ID of the signal received from the beacon device 830.

Figure 9:
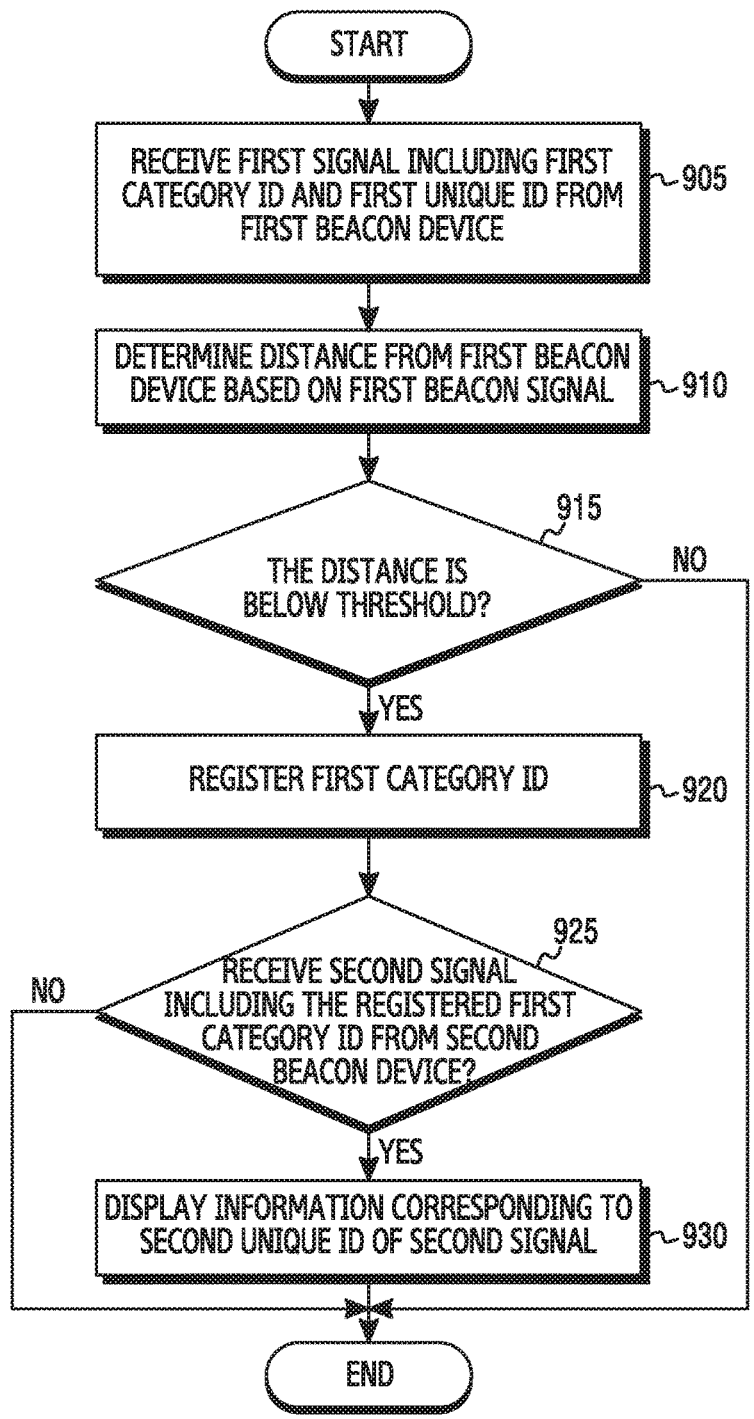
FIG. 9 depicts a method for selectively displaying a user's favorite product information in a UE according to an embodiment of the present disclosure.

FIG. 9 depicts a method for selectively displaying the user's favorite product information in a UE according to an embodiment of the present disclosure.

Referring to FIG. 9, in operation 905, the UE receives a first signal including a first category ID and a first unique ID from a first beacon device. The first category ID can indicate a product type in a store of the first beacon device, and the first unique ID can indicate unique store information of the first beacon device, for example, a product brand of the store.

In operation 910, the UE measures a distance from the first beacon device based on the first beacon signal. The UE can measure a relative distance from the first beacon device based on, for example, RSSI of the signal received from the first beacon device.

In operation 915, the UE determines whether the measured distance falls below a threshold. When the user prefers a particular product, the user is to move to a store of the particular product and accordingly the UE can get close to the beacon device in the store of the particular product. That is, the UE determines the user's favorite product by determining whether the distance between the UE of the user and the beacon device falls below the threshold. The threshold can be defined to cover only the first beacon device in a radius based on the location of the UE, or to indicate a normal distance between the first beacon device of a particular store and the user so as to determine that, when the user shops in a department store or shopping mall and enters the particular store, the user favors a product in the particular store.

When the measured distance falls below the threshold, the UE registers the first category ID of the first signal in operation 920. That is, when the distance between the first beacon device and the UE is below the threshold, the UE determines that the user favors a product in the store of the first beacon device and registers the first category ID of the first signal. The UE can register the first category ID by extracting bits at a pre-arranged location of the category ID on a first signal packet and storing the bits therein. Although not depicted here, when the distance between the first beacon device and the UE is below the threshold, the UE can determine that the user favors a product in the store of the first beacon device and display information corresponding to the first signal. The UE can display the information corresponding to the first signal on its display by extracting the unique ID from the first signal, requesting information corresponding to the unique ID from the server, and receiving and displaying product information of the store indicated by the unique ID from the server. That is, the information corresponding to the first signal is the product information of the store indicated by the unique ID of the first signal, and indicates product information in the store of the first beacon device. For example, when the first category ID of the first signal indicates the product 'shoes', the information indicated by the first signal can include product information in a particular brand store (e.g., one of NIKE™, ADIDAS™, FILA™, Reebok™, Converse™) of the first beacon device and indicated by the unique ID of the first signal.

In operation 925, the UE determines whether a second signal including the first category ID is received from a second beacon device. That is, the UE determines whether the signal from the second beacon device includes the first category ID indicating the user's favorite product type. Whether the second signal including the first category ID is received from the second beacon device can be determined by checking whether the first category ID registered in the UE is the same as the category ID of the second signal.

When receiving the second signal including the first category ID from the second beacon device, the UE displays information corresponding to the second unique ID of the second signal in operation 930. That is, when receiving the second signal including the first category ID from the second beacon device, the UE displays information corresponding to the second unique ID of the second signal on its display regardless of a location of the second beacon device (within or out of the threshold distance from the UE). Although not depicted, the UE can display the information corresponding to the second unique ID of the second signal by extracting the second unique ID from the second signal, requesting information corresponding to the second unique ID from the server, and receiving product information of the store indicated by the second unique ID from the server. That is, the information indicated by the second unique ID of the second signal indicates product information in the store of the second beacon device. For example, when the first category ID of the second signal indicates the product 'shoes', the information corresponding to the second unique ID of the second signal can include product information in a particular brand store (e.g., one of NIKE™, ADIDAS™, FILA™, Reebok™, Converse™) of the second beacon device and indicated by the unique ID of the second signal.

When the distance between the first beacon device and the UE is not below the threshold, the UE does not determine the user's favorite product and thus finishes this process.

When not receiving the second signal including the first category ID from the second beacon device, the UE finishes this process because the second signal from the beacon device does not contain the category ID indicating the user's favorite product.

While the UE receives the signals from the first beacon device and the second beacon device in this embodiment, the UE can receive a beacon signal from any beacon device in the effective communication range. Once the category ID is registered in the UE, when the UE receives the second signal including the same category ID as the registered category ID from the second beacon device, the UE can display the information corresponding to the second signal on its display, regardless the location of the first beacon device in or out of the threshold distance from the UE.

Figure 10:
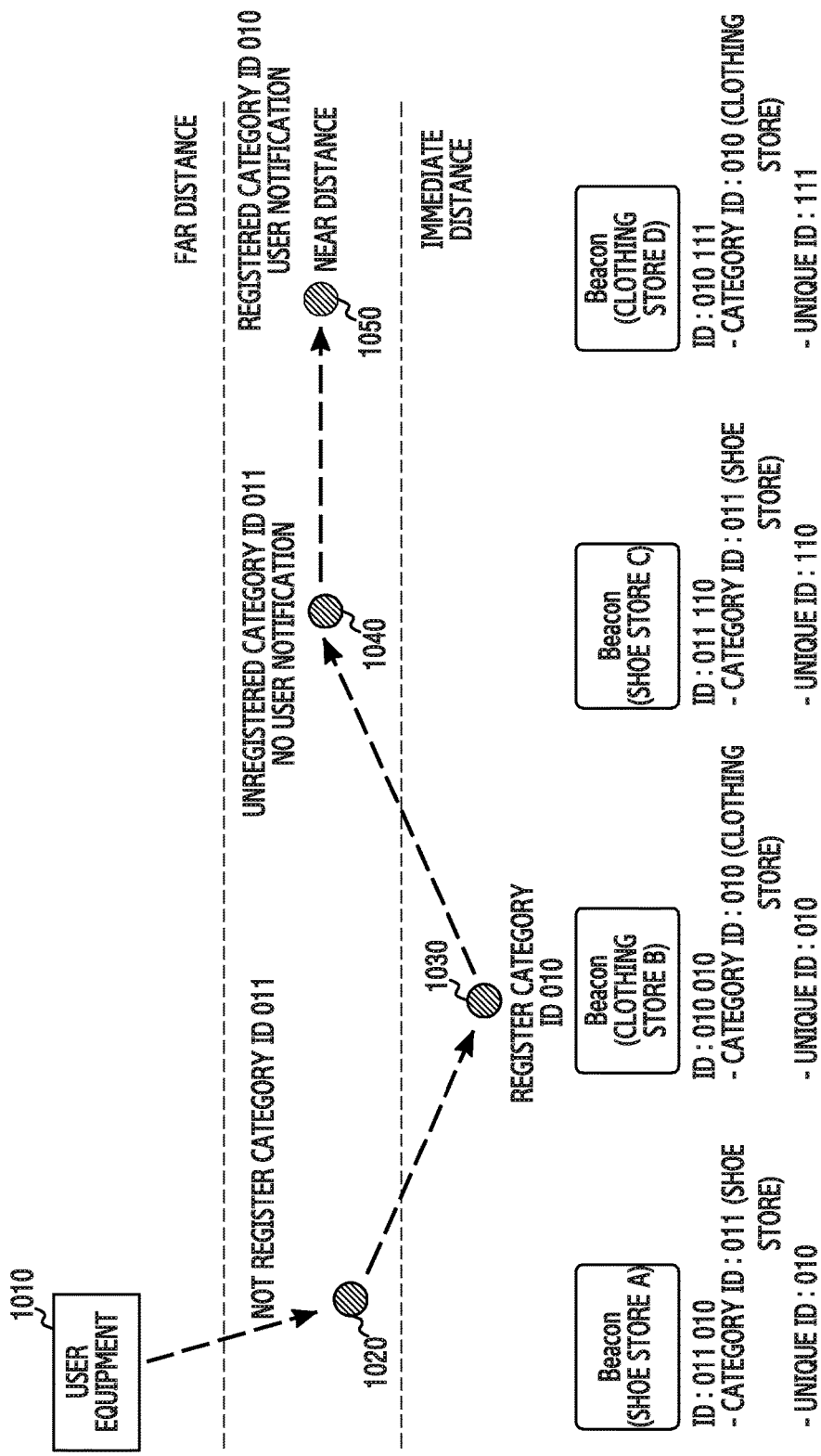
FIG. 10 depicts a UE for selectively receiving product information along a user's movements according to an embodiment of the present disclosure.

FIG. 10 depicts a UE for selectively receiving product information along user's movements according to an embodiment of the present disclosure. Since the user carries his/her UE, the movements in FIG. 10 can be movements of the UE.

Referring to FIG. 10, a distance between a beacon device and the UE is divided into a far distance, a near distance, and an immediate distance. The distance between the beacon device and the UE can be divided based on, for example, RSSI of a signal received at the UE from the beacon device.

The immediate distance can indicate a close distance enough to cover only one particular device in a radius based on the location of the UE. For example, when the user shops in a department store or shopping mall, the immediate distance can indicate a normal distance between a beacon device of a particular store and the user so as to determine that the user entering the particular store favors a product in that particular store. The far distance and the near distance can be divided based on an adequate threshold according to a purpose. When locating the beacon device in the immediate distance, the UE determines that the user favors a product in the store of the beacon device, and extracts and registers a category ID of the beacon signal received from the beacon device. Next, when receiving a beacon signal including the registered category ID, the UE displays information corresponding to the received beacon signal on its display.

In this embodiment, the user starts his/her movements at a location 1010. At the location 1010, it is assumed that there is no category ID registered in the UE. That is, the UE is assumed to determine no user's favorite product at the location 1010. The user moves from the location 1010 to a location 1020. The location 1020 is near a shoe store A. That is, at the location 1020, the UE is near a beacon device of the shoe store A. The beacon device in the shoe store A sends a beacon signal including a category ID '011' and a unique ID '010'. The UE receives the beacon signal from the beacon device of the shoe store A at the location 1020 but does not display information corresponding to the beacon signal. That is, the UE does not display on its display the information corresponding to the beacon signal not matching the registered category ID, or information corresponding to a beacon signal with no registered category ID.

Next, the user moves from the location 1020 to a location 1030. The location 1030 is at an immediate distance from a clothing store B. That is, at the location 1030, the distance between the UE and a beacon device of the clothing store B is the immediate distance. In this case, the UE determines that the user favors clothes, and extracts and registers a category ID from a signal received the beacon device of the clothing store B. For example, when the category ID indicating the clothing is '010', the UE can extract and register a bit string '010' at a preset location on a beacon signal packet received from the beacon device of the clothing store B. To display information of the clothing store B, the UE can display information corresponding to the beacon signal received from the beacon device of the clothing store B on its display. More specifically, the UE can extract a unique ID from the beacon signal received from the beacon device of the clothing store B, and request information corresponding to the unique ID from a server. Upon receiving the request from the UE, the server can send product information of the store indicated by the unique ID to the UE.

After acquiring the product information of the clothing store B, the user moves from the location 1030 to a location 1040. The category ID '010' registered at the location 1030 is stored and maintained in a storage unit of the UE. At the location 1040, the UE can receive a signal from a beacon device of a shoe store C. A category ID in the beacon signal from the beacon device of the shoe store C is different from the category ID registered in the UE. That is, although the UE determines that the user favors the clothing at the location 1030 and registers the category ID '010' indicating the clothes, the beacon signal from the beacon device of the shoe store C contains the category ID '011' indicating the shoes. Accordingly, the UE does not display information corresponding to the beacon signal of the shoe store C.

Next, the user moves from the location 1040 to a location 1050. Since the location 1050 is near a clothing store D, the UE does not register a category ID of a beacon signal received from a beacon device of the clothing store D. However, since a category ID '010' in the beacon signal from the beacon device of the clothing store D is the same as the registered category ID '010', the UE displays information corresponding to the signal of the beacon device of the clothing store D on its display. In this case, the UE can extract a unique ID from the beacon signal and request information corresponding to the unique ID from the server. In response to the request, the server can send product information of the clothing store D to the UE.

In this embodiment, the UE extracts and registers the category ID from the signal received from the beacon device within the threshold distance, and selectively receives the product information according to the user's movements. However, the UE can register the category ID when the user inputs the favorite product list to the UE or when the UE is tagged to the NFC attached to the favorite product. For example, at the location 1040, when receiving the user's favorite product 'shoes' in advance or receiving the category ID indicating the shoes by tagging to the NFC attached to the shoes, the UE can register the category ID indicating the shoes in advance. In this embodiment, the category ID indicating the shoes is defined as '011'. In this case, the UE can receive the beacon signal from the beacon device of the shoe store A even at the location 1020, and display the information corresponding to the beacon signal. That is, the UE, which receives the beacon signal including the category ID matching the registered category ID '011' of the UE, can display the information corresponding to the received beacon signal. More specifically, the UE can extract the unique ID from the beacon signal from the beacon device of the shoe store A, and request the information corresponding to the unique ID from the server. In response to the request, the server can send, for example, product information of the store indicated by the unique ID, to the UE. The UE can display the information corresponding to the beacon signal of the shoe store C on its display at the location 1040. That is, since the UE pre-registers the category ID '011' indicating the shoes and the beacon signal from the beacon device of the shoe store C includes the category ID '011' indicating the shoes, the UE displays the information corresponding to the beacon signal of the shoe store C on its display. Specifically, the UE can extract the unique ID from the beacon signal from the beacon device of the shoe store C, request the information corresponding to the unique ID from the server, receive the product information of the shoe store C from the server, and display the received information on the display.

As such, a plurality of category IDs can be registered in the UE according to how to determine the user's favorite product. That is, the category ID can be registered in the UE based on the user's favorite product input, based on the immediate distance between the UE and the beacon device of the product store, or based on tagging the UE to the NFC attached to the user's favorite product. Also, the UE can register a plurality of category IDs by determining the same favorite product. For example, when the user inputs a plurality of favorite products, the UE can register a plurality of category IDs indicating the favorite products.

Figure 11A:
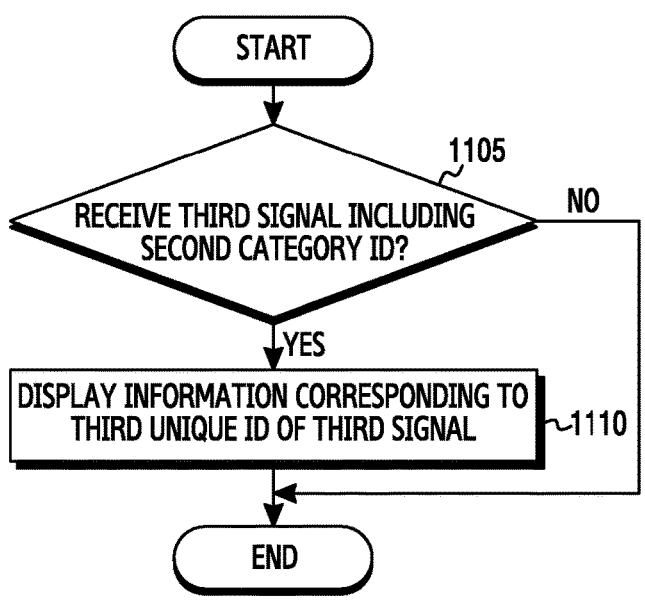
FIG. 11A depicts a method for selectively displaying product information in a UE according to an embodiment of the present disclosure.

FIG. 11A is a flowchart of a method for selectively displaying a user's product information in a UE according to an embodiment of the present disclosure.

Referring to FIG. 11A, the UE can determine the user's favorite product based on whether the distance from the beacon device is the immediate distance, whether the UE is tagged to the NFC of a particular product, or whether the favorite product list is input to the UE. In this embodiment, when the favorite product list is pre-input to the UE or when the UE is tagged to the NFC attached to the favorite product and registers the category ID indicating the favorite product type, the UE receives beacon signals from a plurality of beacon devices and selectively displays favorite product information on its display.

Referring again to FIG. 11A, in operation 1105, the UE determines whether a third signal including a second category ID is received. The second category can indicate a user's favorite product which is pre-input to the UE. When the user's favorite product is pre-input to the UE, the second category ID indicating the favorite product can be already registered in the UE. When the user tags the UE to the NFC attached to the favorite product, the second category ID can indicate the favorite product including the NFC. The UE can receive and register the second category ID through the NFC tagging. The UE receives the third signal from the beacon device and determines whether the third signal includes the second category ID.

When receiving the third signal including the second category ID, the UE displays information corresponding to a third unique ID of the third signal on the display in operation 1110. That is, the UE determines whether the second category ID indicating the favorite product and registered therein is contained in the third signal. When the third signal includes the second category ID, the UE displays information corresponding to the third unique ID of the third signal on its display. In this case, the UE can extract the third unique ID from the third signal and request the information corresponding to the third unique ID from the server. In response to the request from the UE, the server can send product information of the store indicated by the third unique ID to the UE.

When not receiving the third signal including the second category ID, that is, when the third signal does not includes the second category ID registered in the UE, the UE finishes this process. When the third signal does not include the second category ID, the UE does not display information corresponding to the unique ID of the third signal on the display because the user does not favor the product in the store of the beacon device sending the third signal.

Figure 11B:
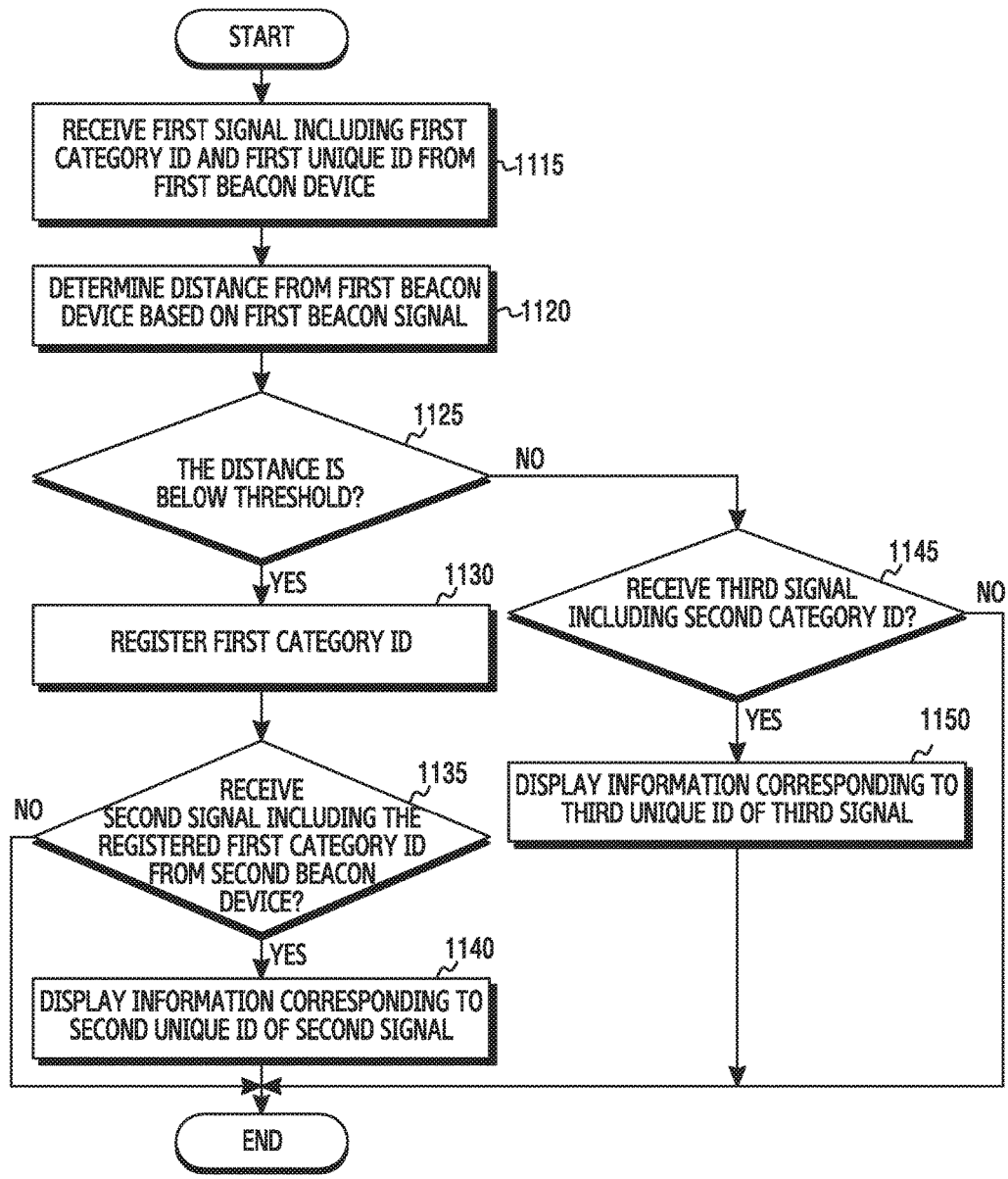
FIG. 11B depicts a method for selectively displaying favorite product information by determining a user's favorite product information in a UE according to an embodiment of the present disclosure.

FIG. 11B depicts a method for selectively displaying favorite product information by determining a user's favorite product information in a UE according to an embodiment of the present disclosure.

Referring to FIG. 11B, in operation 1115, the UE receives a first signal including a first category ID and a first unique ID from a first beacon device. The first category ID can indicate a product type in a store of the first beacon device, and the first unique ID can indicate unique store information, for example, a product brand of the store of the first beacon device.

In operation 1120, the UE measures a distance from the first beacon device based on the first signal. The UE can measure a relative distance between the UE and the first beacon device based on RSSI of the signal received from the first beacon device.

In operation 1125, the UE determines whether the measured distance is below a threshold. When the user favors a particular product, the user is to move to a store of the particular product. Accordingly, the UE can get very close to a beacon device of the store selling the particular product. That is, the UE determines the user's favorite product by checking whether the distance between the UE carried by the user and the beacon device is below the threshold. The threshold can be defined to cover only the first beacon device in a radius based on the location of the UE, or to indicate a normal distance between the first beacon device of a particular store and the user so as to determine that, when the user shops in a department store or shopping mall and enters the particular store, the user favors a product in the particular store.

When the measured distance is below the threshold, the UE registers a first category ID of the first signal in operation 1130. That is, when the distance between the UE and the beacon device falls below the threshold, the UE determines that the user favors a product in the store of the first beacon device and registers the first category ID of the first signal. The UE registers the first category ID by extracting bits at a pre-arranged location of the category ID on a first signal packet and storing the bits therein. Although not depicted here, when the distance between the first beacon device and the UE is below the threshold, the UE can determine that the user favors a product in the store of the first beacon device and display information corresponding to the first signal.

In operation 1135, the UE determines whether a second signal including the first category ID is received from a second beacon device. That is, the UE determines whether the signal from the second beacon device includes the first category ID indicating the user's favorite product type. The UE can determine whether the second signal including the first category ID is received from the second beacon device by determining whether the first category ID registered in the UE is the same as a category ID of the second signal.

Upon receiving the second signal including the first category ID from the second beacon device, the UE displays information corresponding to a second unique ID of the second signal in operation 1140. That is, upon receiving the second signal including the first category ID from the second beacon device, the UE displays information corresponding to the second unique ID of the second signal on the display regardless of a location of the second beacon device (within or out of the threshold distance from the UE). Although not depicted, the UE can display the information corresponding to the second unique ID of the second signal on the display by extracting the second unique ID from the second signal, requesting the information corresponding to the second unique ID from the server, and receiving and displaying product information of the store indicated by the second unique ID from the server.

When the distance between the first beacon device and the UE is not below the threshold, the UE determines whether a third signal including a second category ID is received in operation 1145. That is, although the UE cannot determine the user's favorite product because the UE is not within the threshold distance from the first beacon device, the second category ID indicating the user's favorite product may be registered in the UE. Hence, the UE determines whether the third signal including the registered second category ID is received. Herein, the second category ID may be the same as or different from the first category ID. For example, when the user favors shoes, the UE may register a category ID indicating the shoes by locating in the threshold distance from the first beacon device of the shoe store (the first category ID), by receiving a favorite product list in advance, or by tagging to the NFC attached to the favorite product (the second category ID).

When receiving the third signal including the second category ID, the UE displays information corresponding to a third unique ID of the third signal in operation 1150. That is, the UE determines whether the second category ID indicating the favorite product and registered therein is contained in the third signal. When the third signal includes the second category ID, the UE displays information corresponding to the third unique ID of the third signal on the display. In this case, the UE can extract the third unique ID from the third signal and request information corresponding to the third unique ID from the server. In response to the request from the UE, the server can send product information of the store indicated by the third unique ID to the UE.

When not receiving the second signal including the first category ID from the second beacon device or when not receiving the second signal including the second category ID from the second beacon device, the UE finishes this process. That is, when the category ID in the received third signal is different from the category ID registered in the UE, the UE does not display the information corresponding to the third unique ID of the third signal on the display.

While the UE first determines the distance between the first beacon device and the UE in this embodiment, the UE may first determine whether the third signal including the second category ID is received. That is, the UE can determine the pre-registered second category ID based on the user's favorite product list input or based on the tagging to the NFC attached to the favorite product, determine whether the third signal including the second category ID is received, and then determine the distance between the first beacon device and the UE when receiving no third signal.

The UE can register a plurality of category IDs. Hence, even when the distance between the first beacon device and the UE falls below the threshold, the UE can further determine whether the third signal including the second category ID is received. When receiving the third signal including the second category ID, the UE can display not only the information corresponding to the first unique ID of the first signal but also the information corresponding to the third unique ID of the second signal on the display.

In the various embodiments of the present disclosure, the user carrying the UE can be assumed to shop in a depathnent store or shopping mall, for example, including stores selling various kinds of products. The UE can register one or more category IDs according to the various methods for determining the user's favorite product. The category ID can indicate one kind of the user's favorite product. The UE selectively displays on the display only the information corresponding to the beacon signal including the same category ID as the registered category ID so that the user can obtain only his/her favorite product information. However, the user's favorite product can vary in every shopping period. For example, when the user favors shoes in a first shopping period, a category ID indicating the shoes can be registered in the UE using various ways. When the user favors clothes in a second period, the UE needs to register only a category ID indicating the clothes and to delete the category ID indicating the shoes of the first shopping period. Thus, the UE deletes the previously registered category ID. The present disclosure provides a method for deleting the registered category ID of the UE in various manners.

For example, the user can directly delete the category ID registered in the UE. That is, when the user registers the category ID indicating the favorite product by inputting the favorite product list to the UE, the user can delete the category ID indicating the favorite product by deleting the favorite product list from the UE.

Figure 12A:
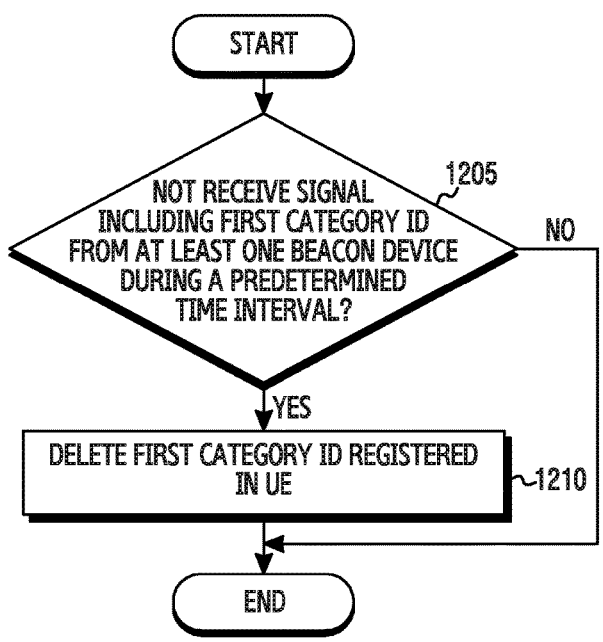
FIGS. 12A and 12B depict a method for deleting category identification (ID) registered in a UE according to various embodiments of the present disclosure.

For example, the UE can delete a registered category ID by determining whether a signal including the registered category ID is received from at least one beacon device during a certain time as shown in FIG. 12A.

FIG. 12A is a flowchart of a method for deleting a category ID registered in a UE according to an embodiment of the present disclosure.

Referring to FIG. 12A, in operation 1205, the UE determines whether a signal including a first category ID is received from at least one beacon device during a certain time. The certain time indicates enough time to determine that the user finishes shopping without receiving the beacon signal including the first category ID. The first category ID indicates a category ID registered in the UE in various fashions.

When not receiving the signal including the first category ID from at least one beacon device during the certain time, the UE deletes the registered first category ID in operation 1210. That is, when determining that the user ends a first shopping period, the UE deletes a category ID indicating a user' favorite product of the first shopping period for the same of a next shopping period.

When receiving the signal including the first category ID from at least one beacon device during the certain time, the UE determines that the first shopping period continues and does not delete the registered first category ID. Next, the UE finishes this process.

Figure 12B:
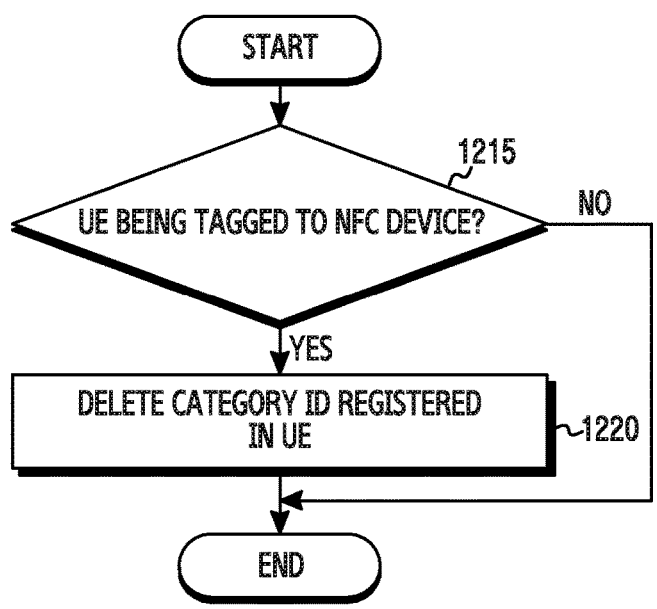

For example, the UE can delete the registered category ID by determining whether the UE is tagged to a NFC device as shown in FIG. 12B.

FIG. 12B is a flowchart of a method for deleting a category ID registered in a UE according to an embodiment of the present disclosure.

Referring to FIG. 12B, in operation 1215, the UE determines whether it is tagged to an NFC device. The NFC device can be placed at an entrance of a shopping place, such as a department store or shopping mall and used for the user to notify the shopping end to the UE. Since the shopping end of the user indicates that the UE gets away from the store of the product, the NFC device can be positioned outside, for example, the effective communication ranges of the first beacon device and the second beacon device.

When the UE is tagged to the NFC device, the UE can delete the registered first category ID in operation 1220. That is, when the UE is tagged to the NFC device, the NFC device can send a signal notifying the shopping end to the UE. The UE receiving the signal notifying the shopping end can determine termination of the first shopping period and delete the registered first category ID.

Figure 13:
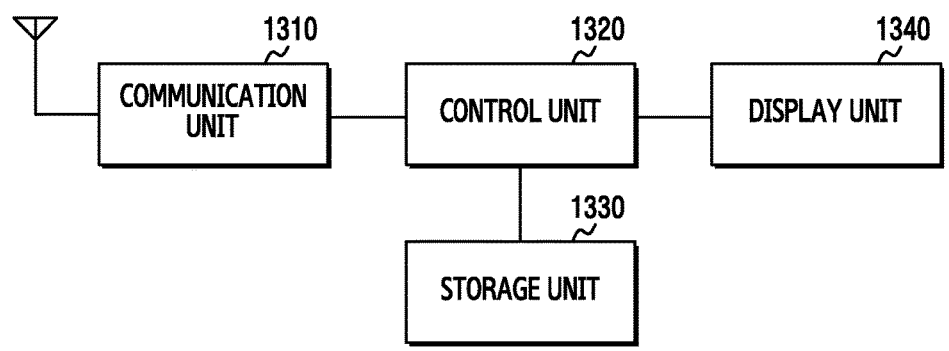
FIG. 13 depicts a UE according to an embodiment of the present disclosure.

FIG. 13 is a block diagram of a UE according to an embodiment of the present disclosure.

Referring to FIG. 13, a communication unit 1310 sends and receives signals over a radio channel. For example, the communication unit 1310 converts a baseband signal to a bit string and vice versa according to a physical layer standard of a system. For example, for data transmission, the communication unit 1310 generates complex symbols by encoding and modulating a transmit bit sting. In data reception, the communication unit 1310 restores the received bit string by demodulating and decoding the baseband signal. The communication unit 1310 up-converts the baseband signal to a Radio Frequency (RF) signal, transmits the RF signal over an antenna, and down-converts an RF signal received over the antenna to a baseband signal. Particularly, the communication unit 1310 can receive the beacon signal from the beacon device or send a product information request message to the server to request the product information. When the UE is tagged to the NFC, the communication unit 1310 can receive an NFC signal. The communication unit 1310 can include a transmit filter, a receive filter, an amplifier, a mixer, an oscillator, a digital to analog converter (DAC), and an analog to digital converter (ADC).

The communication unit 1310 can include a plurality of RF chains. Further, the communication unit 1310 can conduct beamforming. For the beamforming, the communication unit 1310 can adjust a phase and a level of signals transmitted and received via antennas or antenna elements. The communication unit 1310 can include a plurality of communication modules to support different radio access technologies. The communication unit 1310 transmits and receives the signals as stated above. The communication unit 1310 can be referred to as a transmitting unit, a receiving unit, or a transceiving unit.

A control unit 1320 controls the operations of the UE. For example, the control unit 1320 sends and receives the signals through the communication unit 1310. The control unit 1320 records and reads data to and from a storage unit 1330. For doing so, the control unit 1320 can include at least one processor. For example, the control unit 1320 can include a communications processor (CP) for controlling the communication and an application processor (AP) for controlling a high layer such as an application program. The control unit 1320 can direct a display unit 1340 to display data. For example, the control unit 1320 can direct the display unit 1340 to display the product information received from the server. The control unit 1320 can determine whether the UE is in the threshold distance from the beacon device. In the threshold distance from the beacon device, the control unit 1320 can extract the category ID from the signal received from the beacon device and register the extracted category ID in the storage unit 1330. The control unit 1320 can determine whether the UE is tagged to the NFC. When the UE is tagged to the NFC, the control unit 1320 can extract the category ID from the NFC signal and register the extracted category ID in the storage unit 1330. When the user inputs the favorite product list to the UE in advance, the control unit 1320 can identify the category ID indicating the favorite product. Upon receiving the beacon signal, the control unit 1320 determines whether the storage unit 1330 contains the registered category ID. When the storage unit 1330 contains the registered category ID, the control unit 1320 can read the registered category ID from the storage unit 1330 and determine whether the category ID of the received beacon signal is the same as the registered category ID. The control unit 1320 can delete the registered category ID from the storage unit 1330.

The storage unit 1330 stores a basic program for the operations of the UE, an application program, and data such as setting information. The storage device 1330 provides the stored data according to the request of the control unit 1320. The storage unit 1330 can store the category ID extracted by the control unit 1320 from the beacon signal. When the control unit 1320 identifies the category ID indicating the pre-input favorite product list, the storage unit 1330 can store the identified category ID.

The display unit 1340 can include a liquid crystal display (LCD), an active-matrix organic light emitting diode (AM-OLED) display, or other display for displaying texts and/or graphics received from a website, a video, or a game. The display unit 1340 can display the product information received from the server. The display unit 1340 can display the pop-up window before the UE registers the category ID so that the user can determine whether to register the corresponding category ID. The pop-up window can include, for example, a particular message asking the user of the UE to confirm the favorite product. The display unit 1340 can include, for example, a touch screen for inputting data and/or a value.

The methods described in the claims or the specification of the present disclosure can be implemented using hardware and software alone or in combination.

Any such software may be stored in a non-transitory computer readable storage medium. The computer readable storage medium stores one or more programs (software modules) including instructions, which when executed by at least one processor in a UE, cause the UE to perform a method of the present disclosure.

Any such software may be stored in the form of volatile or non-volatile storage such as read only memory (ROM), or in the form of memory such as random access memory (RAM), memory chips, device, or integrated circuits, or on an optically or magnetically readable medium such as a compact disc (CD)-ROM, digital versatile disc (DVD), magnetic disk or magnetic tape or the like.

It will be appreciated that the storage devices and storage media are embodiments of machine-readable storage that are suitable for storing a program or programs comprising instructions that, when executed, implement embodiments of the present disclosure. Accordingly, various embodiments provide a program comprising code for implementing apparatus or a method as claimed in any one of the claims of this specification and a machine-readable storage storing such a program.

As set forth above, the UE can selectively display the information estimated with the received signal strength based on the user's intention, thus protecting user's private information and providing user's favorite product information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a user equipment (UE), the method comprising:
receiving, from a first beacon device, a first signal comprising a first category identification (ID) and a first unique ID;
determining whether a signal strength of the received first signal is below a threshold value or exceeds the threshold value;
registering the first category ID in the UE responsive to a determination that the signal strength of the received first signal exceeds the threshold value;
receiving, from a second beacon device, a second signal comprising a second category ID and a second unique ID different from the first unique ID;
determining whether the second category ID matches the first category ID; and
presenting information corresponding to the second unique ID responsive to the second category ID matching the registered first category ID.

2. The method of claim 1, further comprising:
if a third signal comprising a third category ID is received, presenting information corresponding to a third unique ID of the third signal,
wherein the third category ID is a category ID that is pre-registered in the UE.

3. The method of claim 1, further comprising:
presenting information corresponding to the first unique ID.

4. The method of claim 1, wherein a signal strength of the second signal is below the threshold value.

5. The method of claim 1, wherein the presenting of the information corresponding to the second unique ID comprises:
transmitting a request, for the information corresponding to the second unique ID to a server; and
receiving the information corresponding to the second unique ID from the server.

6. The method of claim 1, further comprising:
determining whether to register the first category ID in the UE based on a distance between the UE and the first beacon device.

7. The method of claim 1, further comprising:
deleting the first category ID registered in the UE.

8. The method of claim 7, wherein the deleting of the first category ID registered in the UE comprises:
if a signal comprising the first category ID is not received from at least one beacon device during a predetermined time interval, deleting the first category ID.

9. The method of claim 1, wherein the threshold value is estimated based on signals received from a plurality of beacon devices according to movements of the UE.

10. The method of claim 1, wherein the information corresponding to the second unique ID comprises a uniform resource locator (URL) and a website corresponding to the URL.

11. A user equipment (UE) comprising:
at least one transceiver configured to receive, from a first beacon device, a first signal comprising a first category identification (ID) and a first unique ID; and
at least one processor configured to determine whether a signal strength of the received first signal is below a threshold value or exceeds the threshold value, and register the first category ID in the UE responsive to a determination that the signal strength of the received first signal exceeds the threshold value,
wherein the at least one transceiver is further configured to receive, from a second beacon device, a second signal comprising a second category ID and a second unique ID different from the first unique ID, and
wherein the at least one processor is further configured to determine whether the second category ID matches the first category ID, and
present information corresponding to the second unique ID responsive to the second category ID matching the registered first category ID.

12. The UE of claim 11,
wherein the at least one processor is further configured to, if a third signal comprising a third category ID is received, present information corresponding to a third unique ID of the third signal, and
wherein the third category ID is a category ID that is pre-registered in the UE.

13. The UE of claim 11, wherein the at least one processor is further configured to:
present information corresponding to the first unique ID.

14. The UE of claim 11, wherein a signal strength of the second signal is below the threshold value.

15. The UE of claim 11, wherein the at least one transceiver is further configured to:
transmit a request, for the information corresponding to the second unique ID, to a server, and
receive the information corresponding to the second unique ID from the server.

16. The UE of claim 11, wherein the at least one processor is further configured to determine whether to register the first category ID in the UE based on a distance between the UE and the first beacon device.

17. The UE of claim 11, wherein the at least one processor is further configured to delete the first category ID registered in the UE.

18. The UE of claim 17, wherein the at least one processor is further configured to, if a signal comprising the first category ID is not received from at least one beacon device during a predetermined time interval, delete the first category ID.

19. The UE of claim 11, wherein the threshold value is estimated based on signals received from a plurality of beacon devices according to movements of the UE.

20. The UE of claim 11, wherein the information corresponding to the second unique ID comprises a uniform resource locator (URL) and a website corresponding to the URL.

* * * * *